W. KNAGGS.
Making Sugar.
No. 83,974.
Patented Nov. 10, 1868.
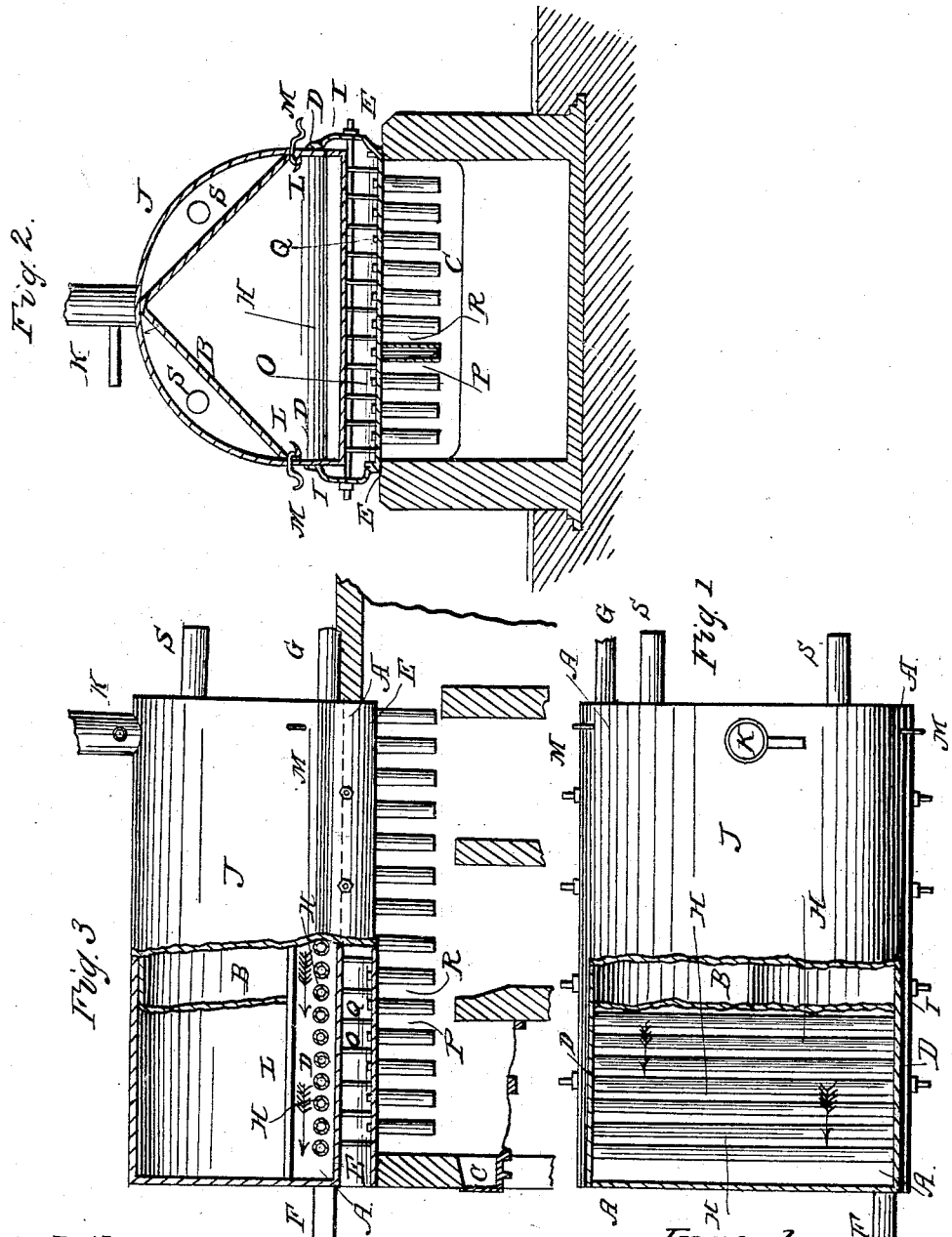

UNITED STATES PATENT OFFICE.

WALTER KNAGGS, OF CLARENDON PARISH, JAMAICA, WEST INDIES.

IMPROVEMENT IN THE MANUFACTURE OF SUGAR.

Specification forming part of Letters Patent No. 83,974, dated November 10, 1868; antedated November 7, 1868.

*To all whom it may concern:*

Be it known that I, WALTER KNAGGS, of the parish of Clarendon, in the county of Middlesex and Island of Jamaica, have invented a new and useful Improvement in the Manufacture of Sugar; and I do hereby declare that the following is a full, clear, and exact description thereof, which will enable those skilled in the art to make and use the same, reference being had to the accompanying drawings, forming part of this specification.

The three great desiderata connected with sugar-making are: defecation or clarification; rapid evaporation out of contact of air; granulation at a low temperature.

By my means of clarification the juice is so completely deprived of all its impurities that it may be boiled down to sirup without throwing up any injurious quantity of scum, and if these sirups be allowed to stand to deposit for a short time they may be passed through animal coal and decolorized, when they will produce perfectly white sugar.

My new process of sugar-making consists in treating cane-juice, as it leaves the mill, with sulphurous acid. I apply it by means of an air-pump, and generate the acid by burning sulphur. The sulphurous acid bleaches vegetable matter, precipitates albumen, and retards fermentation. I then bring the juice as rapidly as possible to the boiling-point, remove the scum as soon as it cracks, and continue the application of heat until ebullition takes place, removing any scum that may be thrown up thereby.

On all estates the juice is brought up to very nearly the boiling-point, either by means of vessels heated by the waste fire from the coppers or by means of waste steam.

The first may be made to boil by means of an auxiliary fire, and the last by injecting steam directly into it after it has been heated by the waste steam. It will be at so high a temperature (generally 190°) that the water condensed in it, by injecting steam, will not be of any importance, considering the very rapid evaporation to which the juice will afterward be subjected.

By my plan of evaporation I deprive the juice of nearly all its nitrogenous impurities, and also of much of its color.

The requisite quantity of sulphurous acid may be ascertained by applying a full excess of it to a small quantity of juice in a suitable vessel, and then bringing the rest of the liquor as close to that sample in appearance as possible. I then add to the juice a small quantity of carbonate of lime or calcareous earth, clay, or marl. This neutralizes any excess of acid, if necessary, and assists in giving weight to the precipitate to be presently formed. I then add sufficient manganic acid to throw down a distinct floculous precipitate (by manganic acid I mean any of the combinations of manganese and oxygen) with or without a base. I generally prefer to apply it in a state of permanganate or manganate of soda. This assists in the separation of any organic matter that may remain in the juice.

I then stop the boiling and draw down the cane-juice into a subsiding-vessel, and add milk of lime until, on examining the liquor in a glass, the impurities will appear thoroughly separated, and the inkonatant or, if it be allowed to subside, the supernatant liquor becomes perfectly bright and transparent.

During the process of drawing down from the clarifier and liming, the juice must be kept well agitated, so that the precipitate formed by the lime may find itself thoroughly combined with the other mechanical impurities.

The milk of lime should be allowed to run slowly in until the proper effect is produced.

The proper quantity of lime having been added, the liquor is to be allowed to rest for a quarter of an hour, more or less, when the whole of the impurities contained in it will be found settled down to within about an inch of the bottom.

The clear liquor is now ready for evaporation, and must be drawn off from the sediment by means of a cock placed close to the bottom in the subsider, and allowed to run into the evaporator.

The sediment may then be further deprived of its juice by means of a strainer, or it may be sent to the still-house.

In the accompanying sheet of drawings, Figure 1 is a plan, Fig. 2 a longitudinal vertical section, and Fig. 3 a cross-section, of the invention.

Similar letters of reference indicate corresponding parts.

The evaporator consists of a metallic tray, A, Figs. 1, 2, 3, of suitable length and width, say six feet by six, which may be made plain or with divisions. In the drawings, Figs. 1 and 2, only a portion of this tray is shown, the other part being left out for the purpose of exhibiting the double corner J B. The tray is surrounded by upright sides D, Figs. 1, 2, 3. The tray has a double bottom, E, Figs. 1, 2, 3.

Now, if cane-juice or any other liquor be admitted in a continuous stream at one end of the tray, by means of the supply-pipe G, Figs. 1 and 3, it will run through the whole length of the tray in the direction shown by the arrows, and make its escape by the discharge-pipe F, Figs. 1 and 3; and if steam be applied to the bottom of the tray during its passage by admission within the double bottom, a very rapid ebullition will take place on account of the small depth of the liquor so exposed to its action.

I propose, however, very much to augment this effect by inserting along the bottom of the tray a number of tubes, H, Figs. 1, 2, 3, running transversely across it throughout its length, and these tubes, (the ends of which communicate, as at I, Figs. 1 and 2, with the double bottom,) being filled with steam, will very much increase the heating-surface acting upon the stream of juice.

The flow of liquor through the evaporator is regulated by valves to pipes of supply and discharge. The evaporating-tray may be fitted with a vacuum apparatus, and the contents discharged by means of a pipe with a trap at the bottom, or dipping into sirup, the pipe being of sufficient length to admit of the column of sirup contained in it counterbalancing the weight or pressure of the atmosphere; or a current of air may be passed over the surface of the boiling liquor to assist evaporation, if preferred So far I have described the apparatus as calculated to work with steam generated by a separate boiler, in case it may be convenient; but I propose, also, that it should generate its own steam. For this purpose I place it over a fire, and the space O, Figs. 2, 3, being filled, as at Q, Figs. 2, 3, to a proper depth with water, becomes a boiler or generator of steam, of which I propose to increase the extent of fire-surface by any of the known arrangements; but I prefer the insertion of a number of vertical tubes, P, Figs. 1, 2, 3, which, being made double, as shown at R, Figs. 1, 2, 3, insure perfect circulation of the water contained in them.

By this means I secure, by the extensive heating-surface exposed to the action of the fire, the greatest possible effect from the least possible quantity of fuel; and as the steam so generated acts immediately upon the bottom of the tray there can be no waste of heat, the condensed water falling back into the generator. The latter being always supplied with condensed water, fouling of the tubes will be impossible.

It is, therefore, evident that by this apparatus cane-juice may be boiled down to sirup or sugar in a few minutes, so that any burning of the liquor is impossible, and the work can be finished off at any time that a stoppage may be necessary, and thus the present plan of leaving the hot coppers full of sirup and cane-juice for hours will be avoided.

It is simply a question of the length of the evaporator to insure the necessary density, and as these trays are so constructed that they can be jointed together in convenient lengths, so that a perfect circulation can be established in all their parts, there will be no difficulty in attaining the required length, while the plan of thus constructing it in sections admits of one being removed and replaced by a spare section, if at any time it should require repair.

Sirup so produced can then be concentrated into sugar *in vacuo*, or by any of the known means of low-temperature evaporation.

I have now shown how two of the desiderata, viz., clarification and rapid evaporation, are to be obtained.

I will now show how contact of air is to be avoided. To effect this I inclose the tray with a cover, J, Figs. 1, 2, 3, in which I place a pipe or chimney, K, Figs. 2, 3. This cover may be made double, as at B, Figs. 1, 2, 3, for reasons presently explained. The steam arising from evaporation fills the space within the cover, and makes its exit by the chimney, so that the heat contained may be economized by its application to working a granulator or low-temperature evaporator, or to any purpose for which the waste steam may be useful. This cover has a small gutter, L, Fig. 2, running all round the lower part of its interior to collect condensed water, and the latter is discharged by means of the pipes M, Fig. 2.

In order to avoid escape of steam the pipes F, G, and M are made on the siphon or trap construction.

I now come to the last of the great desiderata connected with sugar-making, viz., granulation at low temperature. This may be effected, as I stated before, by the vacuum-pan, or by any of the known methods of low-temperature evaporation.

Having thus described the nature of my invention, and the manner of performing the same, I would state that I do not tie myself down to the use of all the items of my clarifying process. I may use one or more, according to circumstances. Thus I may omit the use of sulphurous acid, and in that case it will be best to add carbonate of lime or calcareous earth, clay, or marl to the juice before boiling, so as to neutralize any acidity that may exist in it.

I would also state that the evaporating-tray may be set at an incline, if necessary; or the different sections may be slightly raised, one above the other, so as to insure a fall in the total length.

What I claim as new, and desire to secure by Letters Patent, is—

1. The combined processes for manufacturing sugar herein shown and described.

2. The application of a combination of manganese and oxygen, combined or uncombined with a base.

3. The double cover to the evaporating-tray, composed of the curved outer case J and the inner inclined plates B, constructed and arranged as described, for the purpose specified.

WALTER KNAGGS.

Witnesses:
F. D. SMITH,
WM. E. WARD.